(12) United States Patent
Hsu

(10) Patent No.: US 8,625,024 B2
(45) Date of Patent: Jan. 7, 2014

(54) WEBCAM WITH MOVEABLE ZOOM LENS

(75) Inventor: Ting Chia Hsu, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 12/819,372

(22) Filed: Jun. 21, 2010

(65) Prior Publication Data

US 2011/0037892 A1 Feb. 17, 2011

Related U.S. Application Data

(63) Continuation of application No. 11/692,536, filed on Mar. 28, 2007, now Pat. No. 7,755,697.

(51) Int. Cl.
*H04N 5/225* (2006.01)
*G03B 17/00* (2006.01)

(52) U.S. Cl.
USPC ........... 348/374; 396/72; 396/73; 396/75; 348/373

(58) Field of Classification Search
USPC ............... 348/207.1–207.11, 333.06, 345, 348/373–376, 357, 368; 396/72–88
See application file for complete search history.

(56) References Cited

U.S. PATENT DOCUMENTS

| | | | | |
|---|---|---|---|---|
| 6,031,998 | A * | 2/2000 | Shono | 396/75 |
| 6,639,629 | B1 * | 10/2003 | Takayama et al. | 348/364 |
| 6,766,110 | B1 * | 7/2004 | Oshima et al. | 396/72 |
| 6,926,453 | B2 * | 8/2005 | Hisamatsu | 396/349 |
| 7,126,098 | B2 * | 10/2006 | Nakamura | 250/201.2 |
| 7,446,813 | B2 * | 11/2008 | Nakamoto et al. | 348/374 |
| 7,456,901 | B2 * | 11/2008 | Jeong et al. | 348/374 |
| 7,463,302 | B2 * | 12/2008 | Kobayashi | 348/345 |
| 7,546,028 | B2 * | 6/2009 | Nomura et al. | 396/55 |
| 7,546,029 | B2 * | 6/2009 | Ishizuka et al. | 396/73 |
| 7,613,390 | B2 * | 11/2009 | Nomura et al. | 396/542 |
| 7,755,697 | B2 | 7/2010 | Hsu | |
| 7,872,780 | B2 * | 1/2011 | Nomura et al. | 358/474 |
| 2003/0164895 | A1 * | 9/2003 | Viinikanoja et al. | 348/375 |
| 2003/0169457 | A1 * | 9/2003 | Yasuda | 358/302 |

(Continued)

FOREIGN PATENT DOCUMENTS

| | | |
|---|---|---|
| CN | 1434342 | 8/2003 |
| CN | 1611974 | 5/2005 |
| CN | 1244306 | 11/2005 |
| CN | 1811511 | 8/2006 |

OTHER PUBLICATIONS

Day/Night Exchanger for Pixim Chipsets, Sunex Digital Imaging Optics, Sunex Inc., retrieved on Nov. 11, 201, 2 pgs.

(Continued)

*Primary Examiner* — Timothy J Henn
*Assistant Examiner* — Pritham Prabhakher
(74) *Attorney, Agent, or Firm* — Kilpatrick Townsend & Stockton LLP

(57) ABSTRACT

A webcam with an optical lens that can manually be moved into a position in front of the camera lens. The lens may slide or be rotated to a position in front of the camera lens. The optical lens may be a zoom lens, such that, in combination with the lens of the camera, a fixed zoom or magnification function is provided. Alternately, at least a second lens may also be provided, such as to provide two fixed zoom positions. The two lenses could be moved together with a single mechanical structure, or separately with two different manual controls.

18 Claims, 4 Drawing Sheets

(56) References Cited

U.S. PATENT DOCUMENTS

| | | | |
|---|---|---|---|
| 2005/0101348 A1* | 5/2005 | Wang | 455/556.1 |
| 2005/0104996 A1 | 5/2005 | Makii | |
| 2005/0285967 A1* | 12/2005 | Suda | 348/345 |
| 2006/0115257 A1* | 6/2006 | Nomura | 396/55 |

OTHER PUBLICATIONS

Day/Night Exchanger, Sunex Digital Imaging Optics, Sunex Inc., 2010, 3 pages.

Logitech Invention Disclosure Form ID # 20050329 entitled: "Step Zoom Lens"; Technical disclosure booklet; Oct. 11, 2005, 3 pages, V.4, 3 pages, Stanford Engineering Library, Stanford, CA.

* cited by examiner ative zoom is described, for example, in U.S. Pat. No. 6,489,986.
WEBCAM WITH MOVEABLE ZOOM LENS

CROSS-REFERENCES TO RELATED APPLICATIONS

This application is a continuation of U.S. application Ser. No. 11/692,536, filed Mar. 28, 2007 entitled "Webcam With Moveable Zoom Lens," which application is incorporated herein by reference.

BACKGROUND OF THE INVENTION

This invention relates to webcams, and in particular to webcams with an inexpensive zoom lens.

Many cameras and high-end web cams include a mechanical zoom feature. A lens is moved by a motor to provide the desired zoom. Some webcams come with software for a "software zoom," which basically provides a zoom effect by enlarging the picture, but at a loss of resolution. Such a software or "digital" zoom is described, for example, in U.S. Pat. No. 6,489,986.

Other products include variable lenses. Mobile phones have included cameras, and in US Published Application No. 2005/0101348, a slider is provided with multiple lenses that can be manually slid over the camera lens. This provides a low cost lens change which allows zoom or polarizing lenses to be used. A more complicated zoom device for a mobile phone or other portable device is shown in US Published Application No. 20060132851.

BRIEF SUMMARY OF THE INVENTION

The present invention provides a webcam with an optical lens that can manually be moved into a position in front of the camera lens. The lens may slide or be rotated to a position in front of the camera lens. The optical lens may be a zoom lens, such that, in combination with the lens of the camera, a fixed zoom or magnification function is provided. Alternately, at least a second lens may also be provided, such as to provide two fixed zoom positions.

In one embodiment, a curved cover slides over a camera lens on a rounded webcam, with a zoom lens being on a first part of the curved cover, and a second part of the curved cover acting as a cover blocking the camera lens.

In another embodiment, a magnifying lens and a minimizing (wide angle) lens can alternately be mechanically moved in front of the camera lens.

In another embodiment, the first, original camera lens can also be moved to improve the focus of the second lens. A single mechanical lever may move both a zoom or other lens in front of the original lens, and also move the original lens inward or outward. In an alternate embodiment, the extra lens (zoom, wide angle, etc.) is manually moved in front of the original lens using a first mechanical mechanism (e.g., a slider), and the original lens is moved relative to the image sensor using a second mechanical mechanism (e.g., a focus dial). Alternately, the image sensor may be moved. In an alternate embodiment, one of the lenses is moved manually, and the other is moved with a motor.

DETAILED DESCRIPTION OF THE INVENTION

Figure 1A:
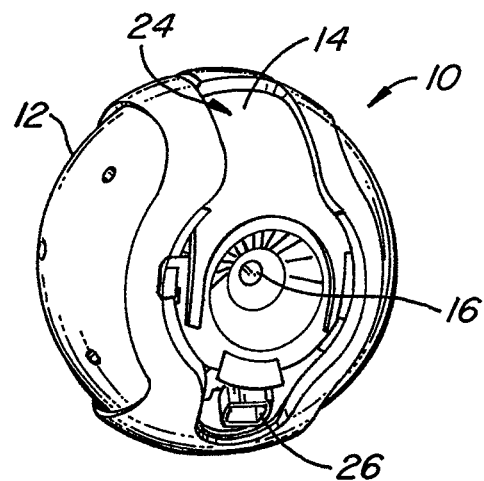
FIGS. 1A and 1B are diagrams of a round webcam with a curved slider including a lens according to one embodiment of the present invention.
Figure 1B:
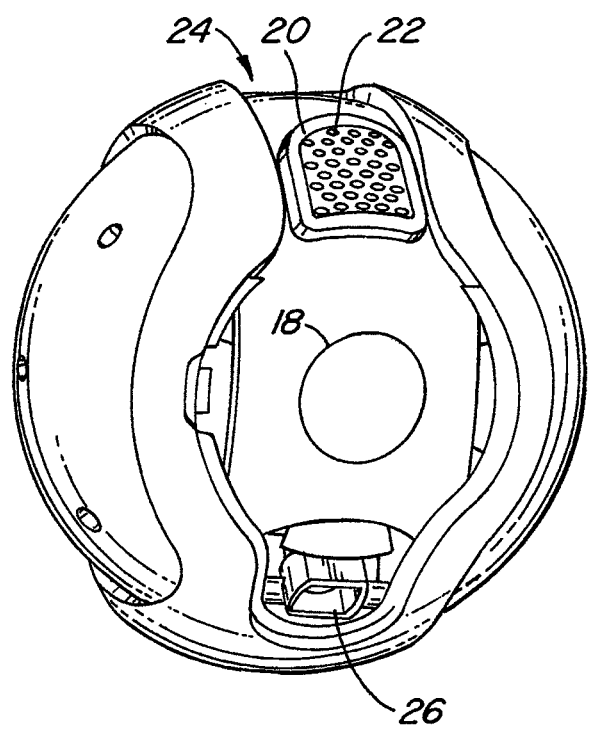

FIGS. 1A and 1B are diagrams of a round webcam 10 with housing 12 having a curved member, or slider, 14 including a lens according to one embodiment of the present invention. FIG. 1A shows the slider in the open position, while FIG. 1B shows the slider in the closed position, with zoom lens 18 positioned in front of camera lens 16. A raised bump 20 with tactile protrusions or holes 22 makes it easy for a user to slide slider 14 within slot 24.

The embodiment includes a support 26 for attaching to a webcam stand. The slider 14, in one embodiment, has a solid plastic portion that may slide in front of lens 16. Thus, depending on how far the slider is moved, it may (1) allow an open view for lens 16, (2) it may act as a lens cover for lens 16, or (3) it may provide a zoom lens in front of lens 16. In one embodiment, the combination of lens 16 and zoom lens 18 provides a magnification of 1.5. Typically, a webcam user does not want a zoom lens with a large magnification. The zoom is usually used to have the user's face fill more of the picture. Thus, in one embodiment, the zoom is by a factor of 2 or less.

Figure 2:
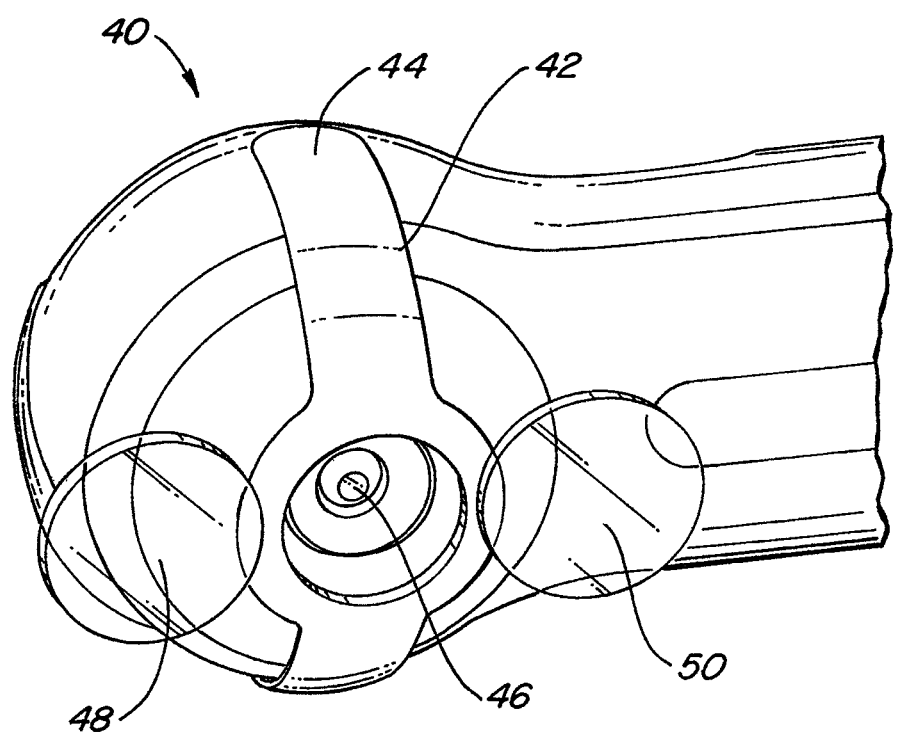
FIG. 2 is a diagram of a webcam with a rotatable member including a lens according to one embodiment of the present invention.

FIG. 2 shows an alternate embodiment of a webcam 40 with a rotating member 42 that rotates about an axis 44, and a similar axis below the webcam. The center of member 42 is open, to allow an unobstructed view by camera lens 46. On the sides of member 42 are a magnifying (zoom) lens 48 and a minimizing (wider field of view) lens 50. Lens 42 may have a magnification of 1.5, while lens 50 has a magnification of 0.75, in one embodiment.

Figure 3A:
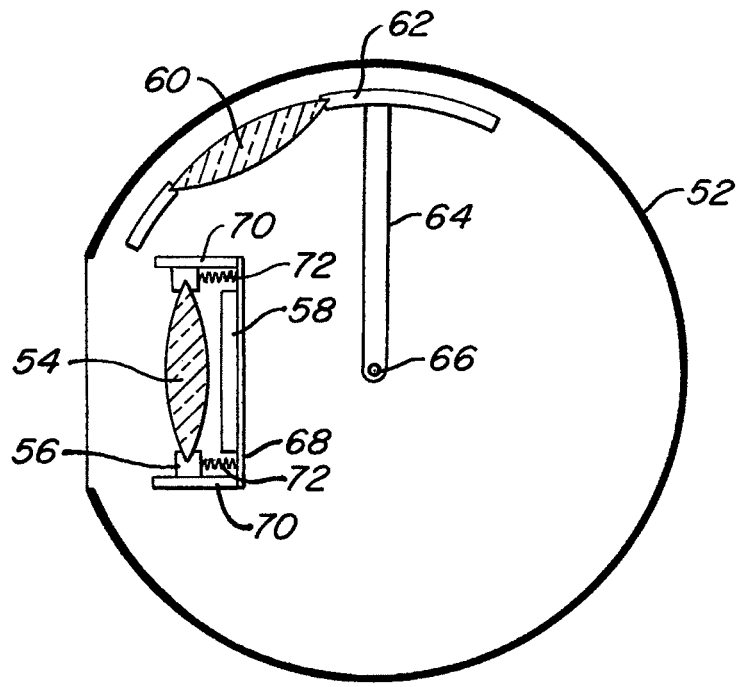
FIGS. 3A and 3B are diagrams of an embodiment illustrating two different positions of a second lens being mechanically moved, with the original lens also being moved.
Figure 3B:
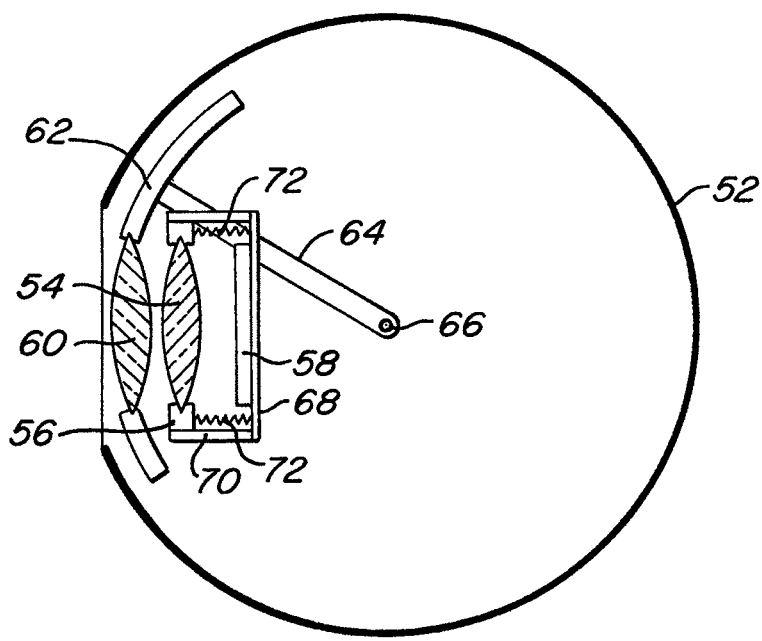

FIGS. 3A and 3B are diagrams of an embodiment illustrating two different positions of a second lens being mechanically moved, with the original lens also being moved. In some embodiments, putting a zoom lens in front of an original lens may result in an out of focus condition. This is because the ideal focus position for the lens relative to the sensor is different when the lens is used alone, compared to when two lenses are used. Thus, one embodiment allows both lenses to be moved with a single mechanical motion.

FIG. 3A shows a webcam housing 52 with an original lens 54 mounted in a lens holder 56 in front of a sensor 58 on a circuit board 68. A second lens 60, such as a zoom lens, is mounted on a curved slider structure 62. An arm 64 is attached to slider structure 62 and rotates about an axis 66. Lens holder 56 slides in guides 70, and is held at a desired position close to sensor 58 by springs 72.

As shown in FIG. 3B, when the slider structure 62 is moved by a users finger to place lens 60 in front of lens 54. The arm 64 moves through a slot in the PCB and contacts the edge of lens holder 56, pushing it outward. As lens holder 56 is pushed outward, the springs 72 are stretched, and guides 70 maintain the lens perpendicular to the sensor 58. Thus, the lens 54 is moved to a new focus position that is ideal for the combination of lens 60 and lens 54.

The slot in the PCB board allows the sensor on the PCB board to be positioned in front of arm 64. Alternately, the arm could be in front of the PCB board, with the axis 66 being mounted on the PCB board or extending through it from behind. Where the arm 64 contacts lens holder 56, there can be a V-shaped groove in holder 56, to allow smooth urging forward of holder 56 by arm 64. Alternately, a protruding member on arm 64 could be used to engage holder 56. In yet other embodiments, the arm 64 could attach to a separate gearing arrangement to move lens holder 56 forward. For example, axis 66 could be an axle attached to a gear which engages a worm gear attached to the lens holder. Thus, as arm 64 rotates, the geared axle rotates, advancing the worm gear and moving lens holder 56 forward. Alternately, lens holder 56 could be moved backward.

Other mechanical mechanisms than that used in FIGS. 3A and 3B could be used. Alternately, one of the lenses could be moved manually, and the other with a motor. In one embodiment, the motor is engaged by a switch activated when the first lens is mechanically moved. For example, the slider could move over a switch controlling the motor.

Figure 4:
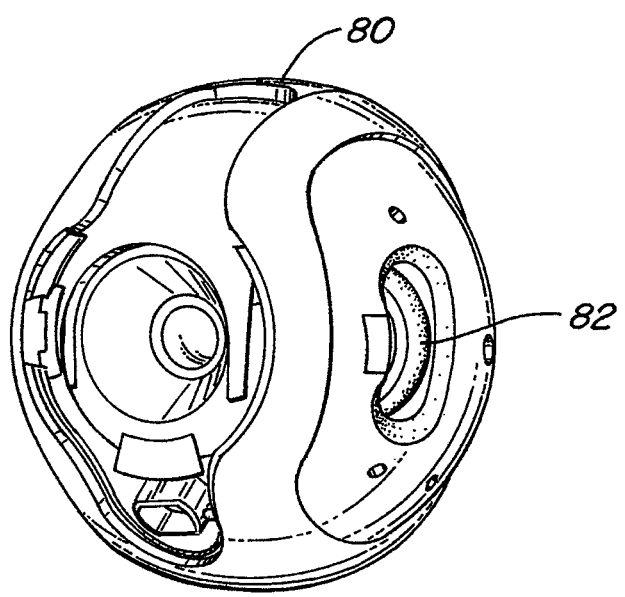
FIG. 4 is a diagram of an embodiment of a webcam showing a dial for adjusting focus after the second lens is in place.

An alternate embodiment is illustrated in FIG. 4. A slider 80 is used to move a second lens in front of the first lens, such as by the mechanism illustrated in FIGS. 3A and 3B. However, instead of the same mechanical mechanism also moving the first lens, a separate focus dial 82 is used to move the first lens between a normal mode and a zoom mode. The focus dial is connected to a set of gears which connect to a support for the first lens, to move it inward or outward. This is an intuitive operation for a user, since first zooming and then focusing is something easy to understand. The separate focus dial allows for more variation, to account for any manufacturing differences in alignment and lenses.

It will be understood that modifications and variations may be effected without departing from the scope of the novel concepts of the present invention. For example, in the embodiment of FIG. 2, two zoom lenses could be used, or one of the lenses can be replaced with an opaque lens cover. The slider of FIGS. 1A and 1B could be outside the housing, rather than inside. Rather than a zoom lens, a magnifying lens or wide angle lens could be provided. The lens slider could easily snap off, so a zoom lens could be replaced with a wide angle lens. Accordingly, the foregoing description is intended to be illustrative, but not limiting, of the scope of the invention which is set forth in the following claims.

What is claimed is:

1. A method for operating a webcam, comprising:
   moving a first lens from a first position wherein an image from said first lens is in focus on an image sensor of said webcam to a second position;
   moving a second lens from a first position not in optical alignment with the first lens, into a second position in optical alignment with said first lens, wherein an image from said first and second lenses is in focus on an image sensor of said webcam with said first and second lenses in the second positions; and
   wherein said moving is done using a single mechanical structure for moving both said first and second lenses in response to a single movement by a user, and said moving of said first lens changes a distance between the first lens and the image sensor.

2. The method of claim 1, wherein said second lens is mounted on a member that slides to a position in front of the first camera lens, said member being curved and slideable within a curved slot in a housing of said webcam.

3. The method of claim 2, wherein said member is moveable via a protrusion configured for engagement with a user's finger.

4. The method of claim 3, further comprising blocking light from entering the first lens via movement of the member to a position that physically obstructs the first lens.

5. The method of claim 1, wherein said webcam includes a rounded housing, and the second lens is disposed on a curved cover that slides over the first lens.

6. The method of claim 1, wherein the second lens provides a magnification of less than or equal to 2.

7. The method of claim 1, wherein a motion of the single mechanical structure exerts a direct physical pressure on a lens holder of the first lens to cause movement of the first lens.

8. A method for operating a webcam, comprising:
   disposing a first lens in a position wherein an image from said first lens is in focus on an image sensor of said webcam;
   moving a second lens from a first position not in optical alignment with the first lens, into a second position in optical alignment with said first lens, and moving said first lens so as to change a distance between said first lens and the image sensor, wherein an image from said first and second lenses is in focus on the image sensor of said webcam; and
   wherein said second lens is mounted on a member that slides to a position in front of the first camera lens, said member being curved and slideable within a curved slot in a housing of said webcam.

9. The method of claim 8, wherein said moving is done using a single mechanical structure for moving both said first and second lenses in response to a single movement by a user.

10. The method of claim 9, wherein a motion of the single mechanical structure exerts a direct physical pressure on a lens holder of the first lens to cause movement of the first lens.

11. The method of claim 8, wherein said member is moveable via a protrusion configured for engagement with a user's finger.

12. The method of claim 8, further comprising blocking light from entering the first lens via movement of the member to a position that physically obstructs the first lens.

13. The method of claim 8, wherein the second lens provides a magnification of less than or equal to 2.

14. A webcam, comprising:
   an aperture;
   an image sensor;
   a first lens;
   a second lens including a first position not in optical alignment with said first lens, and a second position in optical alignment with said first lens, wherein an image from said first and second lenses is in focus on said image sensor when said second lens is in the second position; and
   a mechanical structure configured to move both said first lens and said second lens in response to a single movement by a user,
   wherein said moving of said first lens changes a distance between the first lens and the image sensor.

15. The webcam of claim 14, wherein said mechanical structure includes a protrusion configured for engagement with a user's finger.

16. The webcam of claim 14, wherein the second lens is carried by a member configured to block light from entering the first lens via movement of the member to a position that physically obstructs the first lens.

17. The webcam of claim 14, wherein the second lens provides a magnification of less than or equal to 2.

18. The webcam of claim 14, wherein a motion of the mechanical structure exerts a direct physical pressure on a lens holder of the first lens to cause movement of the first lens parallel to an optical path of the webcam.

* * * * *